(12) United States Patent
Velte et al.

(10) Patent No.: US 6,295,891 B1
(45) Date of Patent: Oct. 2, 2001

(54) ACCELERATOR PEDAL MODULE

(75) Inventors: Uwe Velte, Ottersweier; Rolf Pierenkemper, Buehlertal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,557

(22) PCT Filed: Sep. 9, 1998

(86) PCT No.: PCT/DE98/02659

§ 371 Date: Jul. 14, 1999

§ 102(e) Date: Jul. 14, 1999

(87) PCT Pub. No.: WO99/26802

PCT Pub. Date: Jun. 3, 1999

(30) Foreign Application Priority Data

Nov. 21, 1997 (DE) .............................................. 197 51 520

(51) Int. Cl.[7] .................................................. G05G 1/14
(52) U.S. Cl. ............................................................ 74/513
(58) Field of Search ..................... 74/513, 514; 267/166, 267/167, 180

(56) References Cited

U.S. PATENT DOCUMENTS

| | | | |
|---|---|---|---|
| 99,475 | * | 2/1870 | Rhinelander ........................ 267/166 |
| 4,473,217 | * | 9/1984 | Hashimoto ........................ 267/166 X |
| 4,991,827 | * | 2/1991 | Taylor ................................... 267/149 |
| 5,934,152 | * | 8/1999 | Aschoff et al. ......................... 74/513 |

FOREIGN PATENT DOCUMENTS

| | | | |
|---|---|---|---|
| 637739 | * | 8/1983 | (CH) ................................... 267/168 |
| 2624233 | * | 6/1989 | (FR) ................................... 267/166 |
| 91940 | * | 6/1983 | (JP) ................................... 267/166 |
| 1384852 | * | 3/1988 | (SU) ................................... 267/166 |
| 8808933 | * | 11/1988 | (WO) ................................... 267/166 |

* cited by examiner

*Primary Examiner*—Charles A Marmor
*Assistant Examiner*—Ha Ho
(74) *Attorney, Agent, or Firm*—Ronald E. Greigg; Edwin E. Greigg

(57) ABSTRACT

An accelerator pedal module is provided that is actuated by the driver's foot for controlling the output of a drive engine. Frequently undesirable noise is generated by means of characteristic vibration in the restoring springs of prior pedal modules. The accelerator pedal module of this invention includes an intertwined multi-wire spring which helps to eliminate undesirable vibration of the restoring spring. The accelerator pedal module is provided for controlling the output of a drive engine of a vehicle and forces the pedal module from a full load stop, back to an idle stop

16 Claims, 4 Drawing Sheets

ACCELERATOR PEDAL MODULE

PRIOR ART

The invention is based on an accelerator pedal module for a motor vehicle.

There are already a number of disclosures (e.g. DE 34 11 455 A1; WO 89/07706; WO 97/12780) in which a pivoting body is provided that can be actuated by the driver of the motor vehicle, wherein the position of the pivoting body is designated for establishing the power to be output by the drive engine desired by the driver. A restoring spring is provided in order to restore the pivoting body to an idle position. In order to assure a reliable resetting of the pivoting body under all circumstances, even if there should be a fracture of the restoring spring that restores the pivoting body into the idle position, two restoring springs are usually provided. In order to assure that the restoring force is sufficient for restoring the pivoting body into the idle position when one of the two individual springs of the restoring spring breaks, the restoring spring must by and large be embodied as significantly stronger than is needed for restoring the pivoting body. More precisely stated, in order to assure that the restoring force is sufficient for restoring the pivoting body when one of the two individual springs of the restoring spring breaks, the overall restoring force of the two restoring springs must be more than twice as great as is required. Many people who use the accelerator pedal module find this unpleasant. Another disadvantage is the large amount of space required for the two relatively large individual springs.

In order to give the driver as pleasant a feel as possible when actuating the pivoting body, a friction element is provided, which counteracts an actuation of the pivoting body with a certain frictional resistance. The expense for generating the frictional resistance, however, cannot be ignored and is difficult to produced due to frequently very limited space conditions.

The restoring spring in the known embodiments has a slight tendency to vibrate. As a result, unpleasant noise is produced, which is caused by the restoring spring. Sometimes the attempt is made to shift the noise into an inaudible range in terms of frequency by changing the length of the restoring spring. But this has other disadvantages, for example in terms of strength. Sometimes a damping element is also inserted approximately in the middle of the restoring spring in order to prevent noise. The damping element is provided, for example, between a housing and the restoring spring or between the two individual springs of the restoring spring. The insertion of this damping element, however, signifies an additional expense and also there is the danger of the damping element getting clamped between the coils of the restoring spring and as a result, the restoring spring can have an uneven restoring force. The damping element is comprised, for example, of a foam material resting against the coils of the restoring spring. A further disadvantage is that the durability and effectiveness of this damping element are limited. The installation of the damping element between the spring coils requires a costly manual labor that is difficult to automate.

ADVANTAGES OF THE INVENTION

The accelerator pedal module according to the invention has an advantage over the prior art that the functionally reliable operation of the accelerator pedal module is significantly increased. Even with a potential damage to the restoring spring, the restoring force of the restoring spring only decreases slightly. Therefore it is advantageously not necessary to oversize the restoring spring far beyond the amount required for restoring the pivoting body. As a result, the restoring spring requires a particularly small amount of structural volume.

Through the internal friction of the multi-wire spring, i.e. through the friction between the individual wires of the multi-wire spring, the multi-wire spring suppresses its own vibration. As a result, the restoring spring produces significantly less noise or no noise at all and the spring is prevented from fracturing due to its own vibrations.

Because the vibration damping takes place inside the restoring spring, the significant advantage is obtained that in the dimensioning of the restoring spring, no consideration or hardly any consideration has to be taken as to the natural frequency of the restoring spring.

Since fewer components are required with the accelerator pedal module embodied according to the invention, because two separate springs previously required for safety reasons and an additional damping element are not required in particular for the restoring spring, the expenditure for the assembly is significantly reduced in an advantageous manner. In particular, no pre-assembled structural groups have to be formed.

The internal friction in the multi-wire spring is not only evident due to the reduction in noise or the lack of noise, but without additional expense, this friction also advantageously produces a frictional force that counteracts the movement of the pivoting body, which gives a better feel when actuating the pivoting body. As a result, an additional frictional device can be advantageously eliminated or the additional frictional device can be sized smaller.

An additional damping element required for noise reduction is not necessary, which as a result advantageously reduces the expense significantly when assembling the accelerator pedal module. Because in the past, an additional damping element occasionally led to malfunctions, a risk source for malfunctions is advantageously eliminated without expense.

Advantageous improvements and updates of the accelerator pedal module disclosed are possible by means of the measures set forth hereinafter.

If some or all of the individual wires of the multi-wire spring are secured against drifting out of the multi-wire spring, then the advantage is obtained that a sliding or drifting of an individual wire out of the multi-wire spring need not be feared even with an extended alternating stress on the restoring spring.

BRIEF DESCRIPTION OF THE DRAWINGS

Preferably selected, particularly advantageous exemplary embodiments of the invention are shown in simplified fashion in the drawings and will be explained in more detail in the description that follows.

DESCRIPTION OF THE EXEMPLARY EMBODIMENTS

The accelerator pedal module embodied according to the invention can be used to control different drive engines. The drive engine is, for example, a spark ignition engine, whose throttle valve is adjusted with a control motor. In this instance, the accelerator pedal module is used, for example, to produce electrical signals that are supplied to the control motor that adjusts the throttle valve. The drive engine can, however, also be a diesel engine or an electric motor, wherein in these instances as well, electrical signals come from the accelerator pedal module, which, correspondingly converted, control the output of the drive engine. The transmission of the driver's wishes from the accelerator pedal module to the drive engine, however, can also occur in a purely mechanical fashion, for example by way of a cable control or a Bowden control.

The accelerator pedal module is preferably disposed directly in the action range of the driver of a motor vehicle. The pivoting body of the accelerator pedal module is preferably the gas pedal directly actuated by the driver's foot. If need be, however, it is also possible with no trouble to link a separate gas pedal or another mechanical operating lever to the pivoting body of the accelerator pedal module using simple mechanical means.

Figure 1:
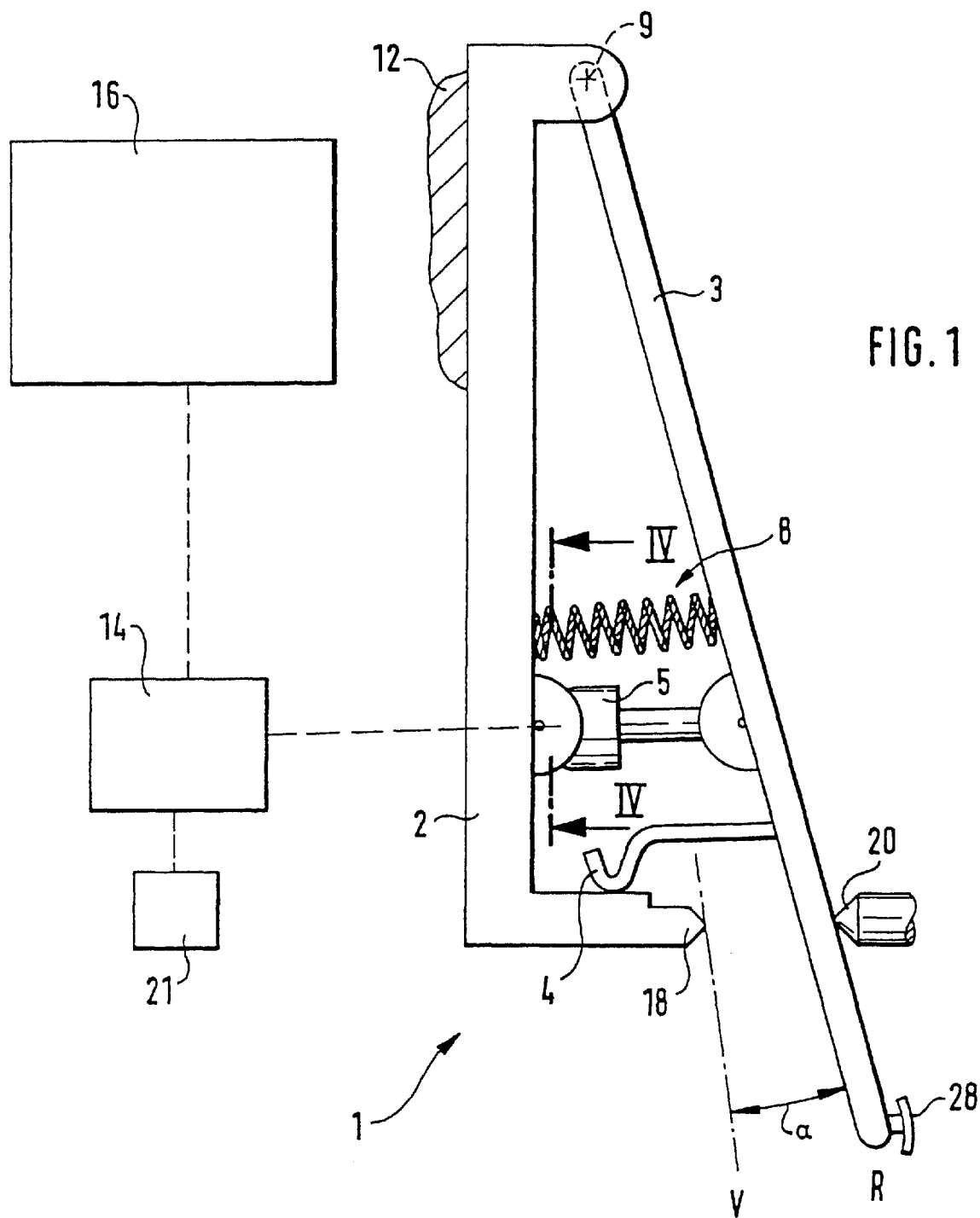
FIG. 1, illustrates a side view of a pedal module of this invention.

FIG. 1 is a schematic depiction of an accelerator pedal module 1. The accelerator pedal module 1 includes a retaining structure 2, a pivoting body 3, a friction device 4, a sensor 5, a restoring spring 8 and a bearing point 9.

The retaining structure 2 is fastened to a chassis 12 symbolically depicted in FIG. 1 by means of a cross-hatching, preferably immediately in the foot region of a vehicle driver. The pivoting body 3 is preferably actuated directly by the driver's foot; the pivoting body 3 can in this instance also be called the gas pedal. However, it is also possible to couple a separate gas pedal to the pivoting body 3 by way of a simple linkage.

The pivoting body 3 is supported at the bearing point 9 so that it can pivot in relation to the retaining structure 2. The sensor 5 senses the position of the pivoting body 3 and sends a signal that corresponds to the position of the pivoting body 3 to a control unit 14 via electrical lines that are depicted with dashed lines in FIG. 1.

The sensor 5 is coupled on the one hand to the retaining structure 2 and on the other hand to the pivoting body 3 so that the movable part of the sensor 5 follows every movement of the pivoting body 3 in a play-free manner.

As a function of the signals sent by the sensor 5 as well as other signals sent to the control unit 14, the control unit 14 controls the output of the drive engine 16, which is symbolically depicted in FIG. 1. The drive engine 16 is, for example, a spark ignition engine, a diesel engine, a hybrid motor, an electric motor, or the like.

A full load stop 18 and an idle stop 20 are provided on the retaining structure 2. If the pivoting body 3 is not actuated by the vehicle driver, then the pivoting body 3, driven by the restoring spring 8, is disposed against the idle stop 20. This position is called the idle position R below. The vehicle driver can actuate the pivoting body 3 until the pivoting body 3 comes into contact with the full load stop 18. This position of the pivoting body 3 against the full load stop 18 is called the full load position V below. The full load position V of the pivoting body 3 is symbolically depicted in FIG. 1 by means of a dot-and-dash line.

If the pivoting body 3 is disposed in the idle position R, then the drive engine 16 operates, for example, with a minimal output provided that the drive engine 16 is not operating with a higher output based on signals of a transmitter 21. The pivoting body 3 can be adjusted over an actuation angle alpha (a). The actuation angle alpha (a) is 15°, for example.

By pivoting the pivoting body 3 around the bearing point 9 over the actuation angle alpha (a), the driver can actuate the pivoting body 3 from the idle position R into the full load position V. When the pivoting body 3 is not actuated, the restoring spring 8 assures that the pivoting body 3 moves into the idle position R. For safety reasons, the assurance must be made that even if the restoring spring 8 cannot act with full force as a result of a defect, the remaining force of the restoring spring 8 is sufficient to restore the pivoting body 3 into the idle position R.

The restoring spring 8 is disposed inside a housing that is not shown in FIG. 1 for the sake of better visibility.

The restoring spring 8 is a multi-wire spring 8. The restoring spring 8, called the multi-wire spring 8 below, is embodied so that a sufficiently great restoring force for restoring the pivoting body 3 into its idle position R is assured even when there is damage to the multi-wire spring 8.

Figure 2:
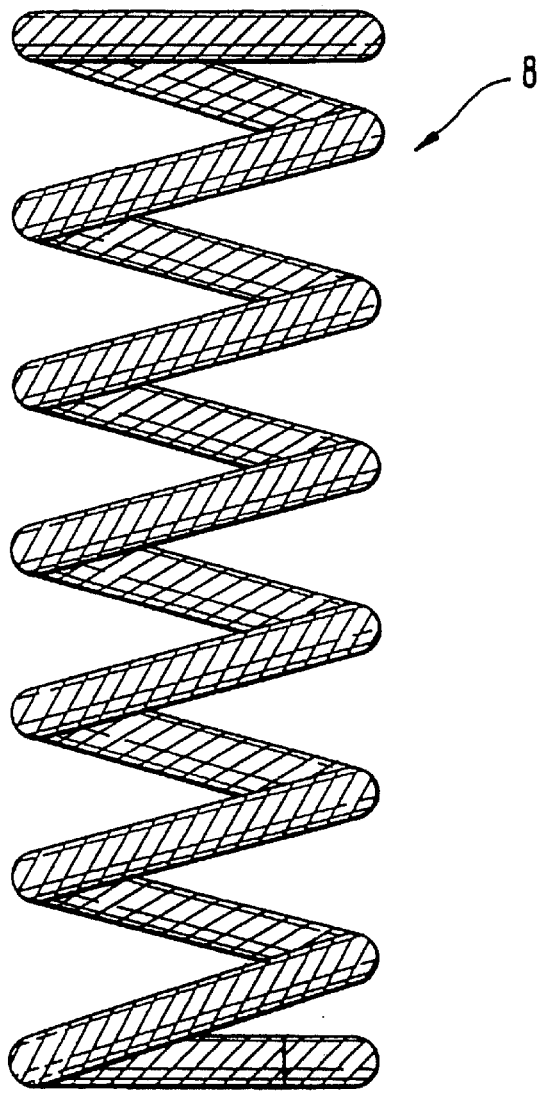
FIG. 2, illustrates a side view of a spring used in the pedal module.
Figure 3:
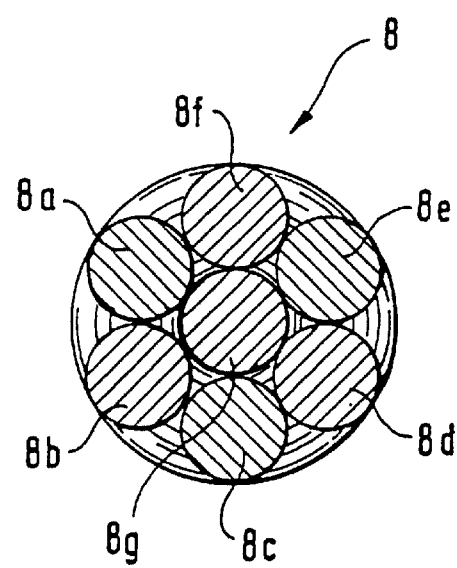
FIG. 3, illustrates a cross sectional view of the spring.

FIGS. 2 and 3 show the multi-wire spring 8 in detail form. FIG. 2 is a side view of the multi-wire spring 8 and FIG. 3 shows a cross sectional area of the multi-wire spring 8.

In all of the Figs. the same parts or parts which have the same function are provided with the same reference numerals. Provided that nothing to the contrary is mentioned or shown in the drawings, that which is mentioned and shown in relation to one of the Figs. also applies to the other exemplary embodiments. Provided that there is nothing to the contrary in the explanations, the details of the different exemplary embodiments can be combined with one another.

The multi-wire spring 8 is comprised of a number of intertwined individual wires. As shown in FIG. 3, the preferably selected multi-wire spring 8 is comprised of a first individual wire 8a, a second individual wire 8b, a third individual wire 8c, a fourth individual wire 8d, a fifth individual wire 8e, a sixth individual wire 8f, and a seventh individual wire 8g. The seventh individual wire 8g is disposed centrally in the cross sectional area of the multi-wire spring 8. The other individual wires 8a to 8f are wound tightly around the seventh individual wire 8g. The individual wires 8a to 8f are wound helically around the individual wire 8g. The individual wires 8a to 8g are intertwined with one another. The individual wires 8a to 8f are wound tightly around the central individual wire 8g so that high frictional forces can be transmitted between the individual wires 8a to 8g. In other words, the individual wires 8a to 8g can only be slid in relation to one another with an increased force. As a result of the more or less tight winding of the individual wires 8a to 8g, the frictional forces can be influenced in a desirable manner. In the side view, a look is produced that is similar to that of an intertwined rope.

The multi-wire spring 8, which is suited for the exemplary embodiment shown in FIG. 1, is shown in detail form in FIG. 2, and is intertwined out of the individual wires 8a to 8g, is wound on the whole like a helical spring. When the two ends of the multi-wire spring 8 are acted on, the entire material cross section of the multi-wire spring 8 is loaded with torsion. This leads to relative movements between the individual wires 8a to 8g. But since the individual wires 8a to 8g are wound or intertwined in relation to one another or around one another, and since lateral forces are transmitted between the individual wires 8a to 8g, frictional forces are produced between the individual wires 8a to 8g, which have a damping effect, which leads to a damping of vibrations of the multi-wire spring 8. As a result, a characteristic vibration of the multi-wire spring 8 can be reliably prevented. This assures that noise caused by the multi-wire spring 8 is either not produced at all or is only produced in a strongly damped manner.

The friction between the individual wires 8*a* to 8*g* of the multi-wire spring 8 also leads to the fact that upon actuation of the pivoting body 3 (FIG. 1), a frictional force, which comes from the multi-wire spring 8 and counteracts the movement of the pivoting body 3, acts on the pivoting body 3.

As a result, when the pivoting body 3 moves, a desired hysteresis is produced. Therefore the friction device 4 (FIG. 1) can be eliminated or the friction device 4 can be embodied as correspondingly weaker and therefore simpler and smaller in structural volume.

Figure 4:
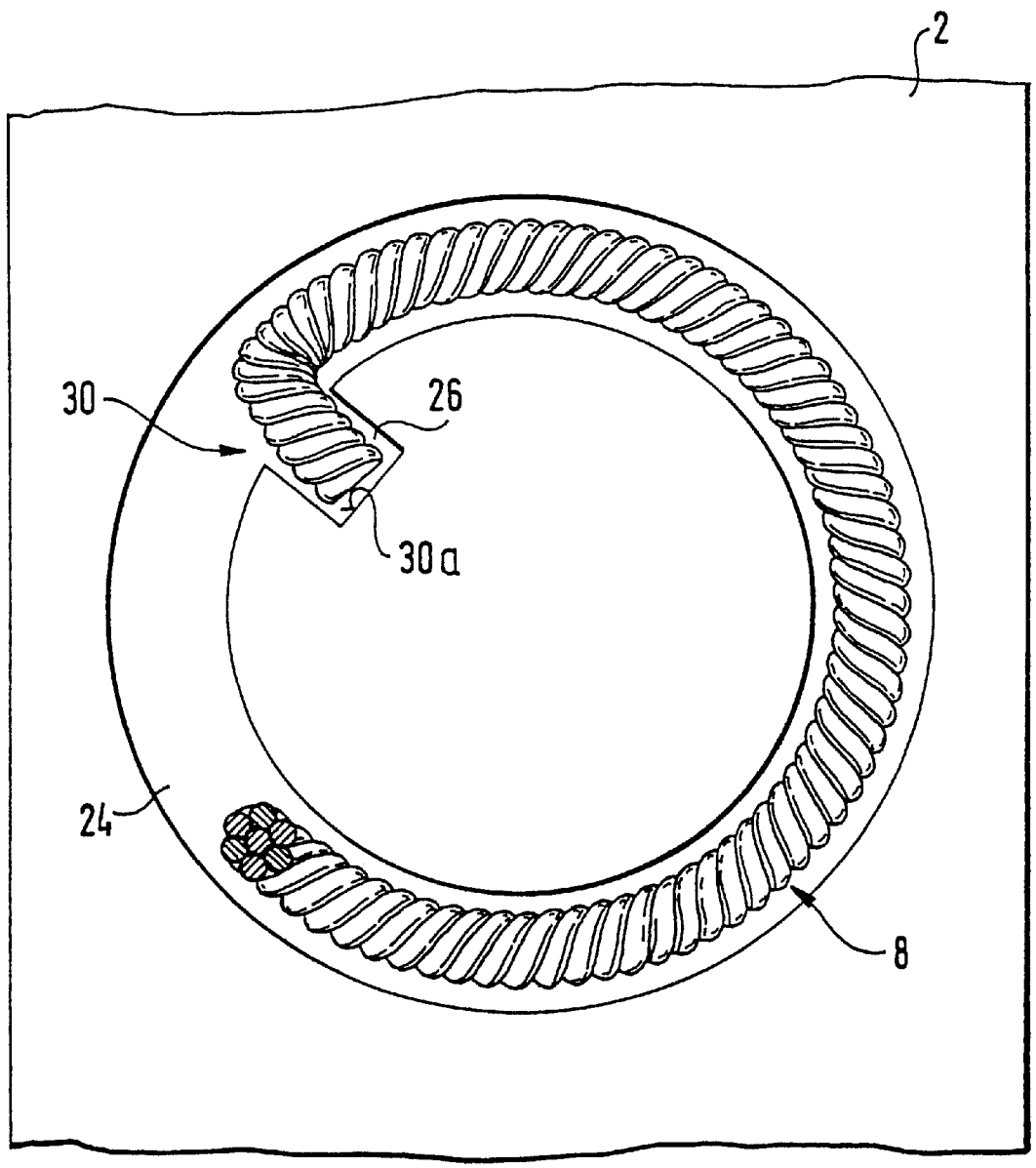
FIG. 4, illustrates a cross section though the spring shown in FIG. 2 also illustrating a retaining structure of one end of the spring.

FIG. 4 shows a cross section through the multi-wire spring 8, viewed in the direction of the retaining structure 2. The intersecting plane is indicated in FIG. 1 with a dot-and-dash line and the viewing direction is indicated by means of an arrow labeled IV.

A circumferential groove 24 is provided on the end face of the retaining structure 2. The spring end of the multi-wire spring 8 that engages the retaining structure 2 is inserted into the groove. A lateral groove 26 is provided cross-wise to the circumferential groove 24. The lateral groove 26 has a groove bottom. The groove bottom constitutes a stop face 30*a*. The end of the multi-wire spring 8 is angled so that the end protrudes into the lateral groove 26. The multi-wire spring 8 ends in the vicinity of the stop face 30*a* or directly against the stop face 30*a*. The stop face 30*a* constitutes a retention device 30. Instead of being provided in a lateral groove, the stop face 30*a* of the retention device 30 can also be provided, for example, directly on the groove bottom of the circumferential groove 24. In this embodiment, which is not depicted graphically, it is not necessary to angle the end of the multi-wire spring 8.

When there are load changes on the multi-wire spring 8, frictional forces are transmitted between the individual wires 8*a* to 8*g*. This can lead to the fact that one or more of the individual wires 8*a* to 8*g* is very slowly but continually slid in one direction. Therefore it can occur that the one or the other of the individual wires 8*a* to 8*g* has a tendency to drift out of the end face of the multi-wire spring 8. The retention device 30 prevents one or more of the individual wires 8*a* to 8*g* from drifting out of the end face of the multi-wire spring 8. An individual wire that drifts out can only come out so far until it rests against the stop face 30*a*. In terms of the overall length of the multi-wire spring 8, a slight outward drift of an individual wire is insignificant, which is why even coarse, easy-to-maintain measurement tolerances can be permitted in the retention device 30.

The proposal is made to embody the spring end of the multi-wire spring 8 connected to the pivoting body 3 in the same manner as is explained in connection with the spring end oriented toward the retaining structure 2.

It is also possible to prevent the individual wires 8*a* to 8*g* from drifting out of the end face by virtue of the fact that on at least one end of the multi-wire spring 8, at least some of the individual wires 8*a* to 8*g* are reciprocally connected to one another. The individual wires 8*a* to 8*g* can be connected to one another on one spring end, for example by means of welding. But because the connecting of the individual wires 8*a* to 8*g* on at least one spring end requires an additional work cycle, reference is made to the proposed retention device 30 (FIG. 4) as a favorable retention possibility.

Because particularly the center individual wire 8*g* (FIG. 3) frequently tends to drift out, the retention device 30 must be embodied so that it at least retains this individual wire 8*g*. Depending on the type of winding of the multi-wire spring 8, the multi-wire spring 8 can possibly also be wound without the center individual wire 8*g*.

Figure 5:
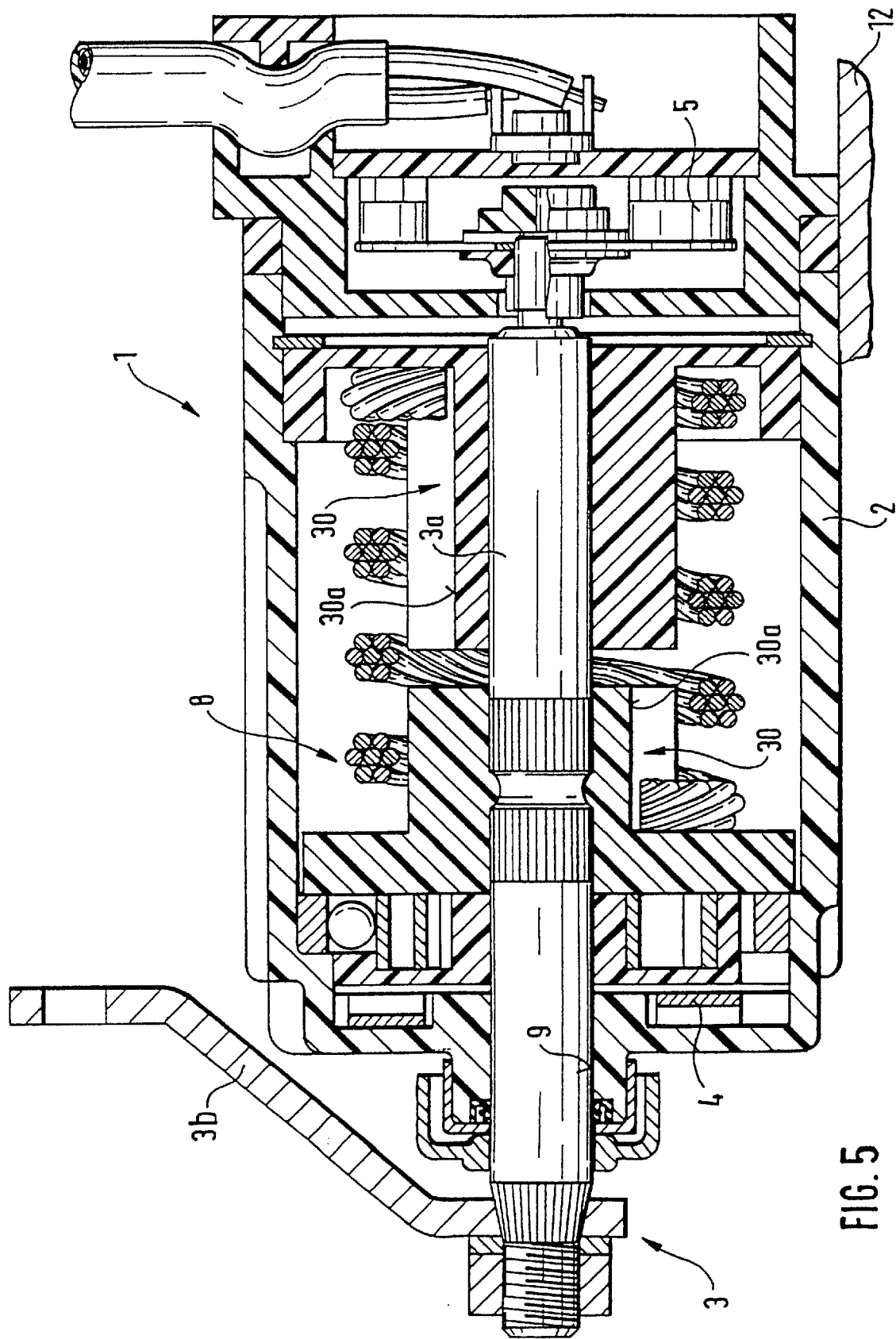
FIG. 5, illustrates a cross sectional view of a modification of the pedal module shown in FIG. 1.

FIG. 5 shows another selected, particularly advantageous exemplary embodiment.

Viewed in the simplest terms, in the embodiment shown in FIG. 5, the retaining structure 2 is a hollow cylindrical formed body in which the pivoting body 3 is supported so that it can rotate. The pivoting body 3 is essentially comprised of a shaft 3*a* that is supported so that it can pivot and a lever 3*b* that is connected to the shaft 3*a*.

With the exception of the differences mentioned below, which essentially concern the restoring spring 8, the accelerator pedal module 1 shown in FIG. 4 is embodied the same as is extensively described in the German Patent Disclosure DE 34 11 455 A1 and in the French Patent Disclosure FR 25 62 010 A derived from it and in the derivative Italian Patent IT 11 84 195 A so that essentially only the existing differences in relation to DE 34 11 455 A1 are discussed below in order to avoid an unnecessary repetition of that which is already known.

In contrast to the accelerator pedal module that is known from the above mentioned references, in the accelerator pedal module 1 (FIG. 5) embodied according to the invention, a multi-wire spring 8 is used that is intertwined out of several, preferably at least three, and particularly preferably seven individual wires 8*a* to 8*g* (FIG. 3). As described and demonstrated extensively in DE 34 11 455 A1, the restoring spring 8 is coupled to the retaining structure 2 on one end and is coupled to the pivoting body 3 on the other. Although in contrast to the accelerator pedal module known from DE 34 11 455 A1, in the accelerator pedal module 1 embodied according to the invention, only the one multi-wire spring 8 is used as the restoring spring 8, despite this fact, a high degree of reliability is also produced even if some of the individual wires 8*a* to 8*g* of the multi-wire spring 8 should fail.

Because the multi-wire spring 8 is comprised of a multitude of individual wires 8*a* to 8*g*, with a possible breakage of one of the individual wires 8*a* to 8*g*, the restoring force only decreases by a relatively small amount. In comparison to the known accelerator pedal module, since only the one multi-wire spring 8 is required to achieve the necessary restoring reliability, the overall restoring force of the restoring spring 8 does not have to be as greatly oversized, which is why one can achieve the fact that the accelerator pedal module 1 embodied according to the invention can be embodied as smaller than the accelerator pedal module known from DE 34 11 455 A1.

In the exemplary embodiment according to FIG. 5, when the lever 3*b* of the pivoting body 3 is actuated, the multi-wire spring 8 is acted on with torsional forces. This leads to a bending stress on the material cross section of the multi-wire spring 8. This produces relative movements between the individual wires 8*a* to 8*g* of the multi-wire spring 8. This relative movement produces friction between the individual wires 8*a* to 8*g* of the multi-wire spring 8. As a result of this friction, vibrations of the multi-wire spring 8 are prevented or are at least so intensely damped that no interfering characteristic vibrations are produced and therefore no unpleasant noise is generated.

Since the friction between the individual wires 8*a* to 8*g* of the multi-wire spring 8 counteracts a movement of the pivoting body 3 in the same manner as the friction device 4, whose operation is described extensively in DE 34 11 455 A1, the friction between the individual wires 8*a* to 8*g* can replace or at least support the friction device 4.

Therefore in comparison to the prior art known from DE 34 11 455 A1, the friction device 4 can be embodied as weaker and consequently smaller in volume and simpler, or the friction device 4 can be completely eliminated.

So that the individual wires 8a to 8g cannot drift out of the end face of the multi-wire spring 8, in the exemplary embodiment shown in FIG. 5 as well, the respective retention device 30 is provided with the contact face 30a at the place where the multi-wire spring 8 is coupled to the retaining structure 2 and at the place where the multi-wire spring 8 is coupled to the pivoting body 3.

The foregoing relates to preferred exemplary embodiments of the invention, it being understood that other variants and embodiments thereof are possible within the spirit and scope of the invention, the latter being defined by the appended claims.

What is claimed is:

1. An accelerator pedal module for controlling an output delivered by a drive engine, with a pivoting body (3) that is supported at a bearing point (9) on a retaining structure (2), said pivoting body 3 is pivoted around a pivot axis over a pivoting angle (a), a single restoring spring (8) that engages at least indirectly with the retaining structure (2) and at least indirectly with the pivoting body (3) is provided for restoring the pivoting body (3) into an idle position (R), the single restoring spring (8) is a multi-wire spring (8) intertwined out of a number of individual wires (8a–8g), wherein, if one of the wires of the multi-wire spring should break, the remaining wires of the multi-wire spring will still provide sufficient return force to the pivoting body, with very little loss of return force by the multi-wire spring.

2. The accelerator pedal module according to claim 1, in which the multi-wire spring (8) is acted on with compressive forces.

3. The accelerator pedal module according to claim 2, in which the multi-wire spring (8) is a compression spring, wherein the individual wires (8a–8g) are acted on with torsion.

4. The accelerator pedal module according to claim 1, in which the multi-wire spring (8) is acted on with torsional forces.

5. The accelerator pedal module according to claim 4, in which the multi-wire spring (8) is a torsion spring, wherein the individual wires (8a–8g) are stressed by bending.

6. The accelerator pedal module according to claim 1, in which at least some of the individual wires (8a–8g) are secured against drifting out of the multi-wire spring (8) by means of a retention device (30).

7. The accelerator pedal module according to claim 2, in which at least some of the individual wires (8a–8g) are secured against drifting out of the multi-wire spring (8) by means of a retention device (30).

8. The accelerator pedal module according to claim 3, in which at least some of the individual wires (8a–8g) are secured against drifting out of the multi-wire spring (8) by means of a retention device (30).

9. The accelerator pedal module according to claim 4, in which at least some of the individual wires (8a–8g) are secured against drifting out of the multi-wire spring (8) by means of a retention device (30).

10. The accelerator pedal module according to claim 5, in which at least some of the individual wires (8a–8g) are secured against drifting out of the multi-wire spring (8) by means of a retention device (30).

11. The accelerator pedal module according to claim 1, in which at least some of the individual wires (8a–8g) are connected on at least one end of the multi-wire spring (8) to prevent the individual wires from reciprocally sliding against one another.

12. The accelerator pedal module according to claim 2, in which at least some of the individual wires (8a–8g) are connected on at least one end of the multi-wire spring (8) to prevent the individual wires from reciprocally sliding against one another.

13. The accelerator pedal module according to claim 3, in which at least some of the individual wires (8a–8g) are connected on at least one end of the multi-wire spring (8) to prevent the individual wires from reciprocally sliding against one another.

14. The accelerator pedal module according to claim 4, in which at least some of the individual wires (8a–8g) are connected on at least one end of the multi-wire spring (8) to prevent the individual wires from reciprocally sliding against one another.

15. The accelerator pedal module according to claim 5, in which at least some of the individual wires (8a–84g) are connected on at least one end of the multi-wire spring (8) to prevent the individual wires from reciprocally sliding against one another.

16. The accelerator pedal module according to claim 6, in which at least some of the individual wires (8a–8g) are connected on at least one end of the multi-wire spring (8) to prevent the individual wires from reciprocally sliding against one another.

* * * * *